United States Patent
Dry et al.

(10) Patent No.: US 6,989,042 B2
(45) Date of Patent: Jan. 24, 2006

(54) DIRECT SMELTING PROCESS AND APPARATUS

(75) Inventors: Rodney J. Dry, City Beach (AU); Peter D. Burke, Winthrop (AU)

(73) Assignee: Technological Resources Pty Ltd, Melbourne ( * ) Notice: Subject to any disclaimer, the term of this patent is extended or adjusted under 35 U.S.C. 154(b) by 128 days.

(21) Appl. No.: 10/257,721

(22) PCT Filed: Apr. 11, 2001

(86) PCT No.: PCT/AU01/00419

§ 371 (c)(1),
(2), (4) Date: Mar. 12, 2003

(87) PCT Pub. No.: WO01/81637

PCT Pub. Date: Nov. 1, 2001

(65) Prior Publication Data

US 2004/0031355 A1    Feb. 19, 2004

(30) Foreign Application Priority Data

Apr. 17, 2000 (AU) ................................. PQ6950

(51) Int. Cl.
*C21B 13/00* (2006.01)
(52) U.S. Cl. .......................................... 75/501; 75/502
(58) Field of Classification Search .................. 75/501, 75/502; 266/225
See application file for complete search history.

(56) References Cited

U.S. PATENT DOCUMENTS 6,482,249 B1 * 11/2002 Dry ............................... 75/502
6,596,223 B2 * 7/2003 Dry ............................... 266/225
6,626,977 B1 * 9/2003 Dry ............................... 75/502

FOREIGN PATENT DOCUMENTS

EP        0 308 925        3/1989

(Continued)

OTHER PUBLICATIONS

Romelt Offers Flexible Single Step Hot Metal Without Coke, Steel Times International (Inc. Steel Times), DMG World Media, Redhill, Surrey, GB, vol., 20, No. 1, 1996, pp. 40-41.

(Continued)

*Primary Examiner*—Melvyn Andrews
(74) *Attorney, Agent, or Firm*—Miles & Stockbridge P.C.; Edward J. Kondracki (57) ABSTRACT

A molten-bath based direct smelting process and apparatus for producing metals from a ferrous material is disclosed. The process includes injecting feed materials being solid material and carrier gas into a molten bath at a velocity of at least 40 m/s through at least one downwardly extending solids injection lance having a delivery tube of internal diameter of 40–200 mm that is located so that a central axis of an outlet end of the lance is at an angle of 20 to 90 degrees to a horizontal axis. The feed materials injection generates a superficial gas flow of at least 0.04 $Nm^3/s/m^2$ within the molten bath at least in part by reactions of injected material in the bath. The gas now causes molten material to be projected upwardly as splashes, droplets and streams and form an expanded molten bath zone, with the gas flow and the upwardly projected molten material causing substantial movement of material within the molten bath and strong mixing of the molten bath. The feed materials are selected so that, in an overall sense, the reactions of the feed materials in the molten bath are endothermic. The process also includes injecting an oxygen-containing gas into an upper region of the vessel via at least one oxygen gas injection lance and post-combusting combustible gases released from the molten bath.

17 Claims, 5 Drawing Sheets

FOREIGN PATENT DOCUMENTS

| | | |
|---|---|---|
| WO | WO 96/31627 A | 10/1996 |
| WO | WO 98/27232 A | 6/1998 |
| WO | WO 99/16911 | 4/1999 |
| WO | WO 00/01854 | 1/2000 |
| WO | WO 00/01855 | 1/2000 |
| WO | WO 00/14285 | 3/2000 |

OTHER PUBLICATIONS

Ruer, J., Production and Utilization of Iron Carbide, Cahiers D'Informations Techniques de la Revue de Metallurgie, Revue de Metallurgie, France, vol. 94, no 4, Apr. 1, 1997, pp. 445-453.

* cited by examiner

DIRECT SMELTING PROCESS AND APPARATUS

BACKGROUND OF THE INVENTION

1. Field of the Invention

The present invention relates to a process and an apparatus for producing molten metal (which term includes metal alloys), in particular although by no means exclusively iron, from ferrous material, such as ores, partly reduced ores and metal-containing waste streams.

The present invention relates particularly to a molten metal bath-based direct smelting process and an apparatus for producing molten metal from a ferrous material.

2. Description of Related Art

One known molten bath-based direct smelting process for producing molten ferrous metal is the DIOS process. The DIOS process includes a pre-reduction stage and a smelt reduction stage. In the DIOS process ore (−8 mm) is pre-heated (750° C.) and pre-reduced (10 to 30%) in fluidised beds using offgas from a smelt reduction vessel which contains a molten bath of metal and slag, with the slag forming a deep layer on the metal. The fine (−3 mm) and coarse (−8 mm) components of the ore are separated in the pre-reduction stage of the process. Coal and pre-heated and pre-reduced ore (via two feed lines) are fed continuously into the smelt reduction furnace from the top of the furnace. The ore dissolves and forms FeO in the deep layer of slag and the coal decomposes into char and volatile matter in the slag layer. Oxygen is blown through a specially designed lance that improves secondary combustion in the foamed slag. Oxygen jets burn carbon monoxide that is generated with the smelting reduction reactions, thereby generating heat that is transferred to the molten slag. The FeO is reduced at the slag/metal and slag/char interfaces. Stirring gas introduced into the hot metal bath from the bottom of the smelt reduction vessel improves heat transfer efficiency and increases the slag/metal interface for reduction. Slag and metal are tapped periodically.

Another known direct smelting process for producing molten ferrous metal is the AISI process. The AISI process also includes a pre-reduction stage and a smelt reduction stage. In the AISI process pre-heated and partially pre-reduced iron ore pellets, coal or coke breeze and fluxes are top charged into a pressurised smelt reactor which contains a molten bath of metal and slag. The coal devotalises in the slag layer and the iron ore pellets dissolve in the slag and then are reduced by carbon (char) in the slag. The process conditions result in slag foaming. Carbon monoxide and hydrogen generated in the process are post combusted in or just above the slag layer to provide the energy required for the endothermic reduction reactions. Oxygen is top blown through a central, water cooled lance and nitrogen is injected through tuyeres at the bottom of the reactor to ensure sufficient stirring to facilitate heat transfer of the post combustion energy to the bath. The process offgas is de-dusted in a hot cyclone before being fed to a shaft type furnace for pre-heating and pre-reduction of the pellets to FeO or wustite.

Another known direct smelting process, which relies on a molten metal layer as a reaction medium, and is generally referred to as the HIsmelt process, is described in International application PCT/AU96/00197 (WO 96/31627) in the name of the applicant.

The HIsmelt process as described in the International application comprises:

(a) forming a bath of molten metal and slag in a vessel;

(b) injecting into the bath:
  (i) metalliferous feed material, typically metal oxides; and
  (ii) a solid carbonaceous material, typically coal, which acts as a reductant of the metal oxides and a source of energy; and (c) smelting the metalliferous feed material to metal in the metal layer.

The HIsmelt process also comprises injecting oxygen-containing gas into a space above the bath and post-combusting reaction gases, such as CO and $H_2$, released from the bath and transferring the heat generated to the bath to contribute to the thermal energy required to smelt the metalliferous feed materials.

The HIsmelt process also comprises forming a transition zone in the space above the nominal quiescent surface of the bath in which there is a favourable mass of ascending and thereafter descending droplets or splashes or streams of molten materiel which provide an effective medium to transfer to the bath the thermal energy generated by post-combusting reaction gases above the bath.

The HIsmelt process as described in the international application is characterised by forming the transition zone by injecting a carrier gas, metalliferous feed material, and solid carbonaceous material into the bath through a section of the side of the vessel that is in contact with the bath and/or from above the bath so that the carrier gas and the solid material penetrate the bath and cause molten material to be projected into the space above the surface of the bath.

The HIsmelt process as described in the International application is an improvement over earlier forms of the HIsmelt process which form the transition zone by bottom injection of gas and/or carbonaceous material into the bath which causes droplets and splashes and streams of molten material to be projected from the bath.

SUMMARY OF THE INVENTION

The applicant has carried out extensive research and pilot plant work on direct smelting processes and has made a series of significant findings in relation to such processes.

In general terms, the present invention provides a direct smelting process for producing metals (which term includes metal alloys) from a ferrous material which includes the steps of:

(a) forming a bath of molten metal and molten slag in a metallurgical vessel;

(b) injecting feed materials being solid material and carrier gas into the molten bath at a velocity of at least 40 m/s through a downwardly extending solids injection lance having a delivery tube of internal diameter of 40–200 mm that is located so that a central axis of an outlet end of the lance is at an angle of 20 to 90 degrees to a horizontal axis and generating a superficial gas flow of at least 0.04 $Nm^3/s/m^2$ within the molten bath (where $m^2$ relates to the area of a horizontal cross-section through the molten bath) at least in part by reactions of injected material in the bath which causes molten material to be projected upwardly as splashes, droplets and streams and form an expanded molten bath zone, the gas flow and the upwardly projected molten material causing substantial movement of material within the molten bath and strong mixing of the molten bath, the feed materials being selected so that, in an overall sense, the reactions of the feed materials in the molten bath are endothermic; and (c) injecting an oxygen-containing gas into an upper region of the vessel via at least one oxygen gas injection lance and post-combusting combustible gases released from the molten bath, whereby ascending and thereafter descending molten material in the expanded molten bath zone facilitate heat transfer to the molten bath.

The expanded molten bath zone is characterised by a high volume fraction of gas voidages throughout the molten material.

Preferably the volume fraction of gas voidages is at least 30% by volume of the expanded molten bath zone.

The splashes, droplets and streams of molten material are generated by the above-described flow of gas within the molten bath. Whilst the applicant does not wish to be bound by the following comments, the applicant believes that the splashes, droplets and streams are generated by a churn-turbulent regime at lower gas flow rates and by a fountain regime at higher gas flow rates.

Preferably the gas flow and the upwardly projected molten material cause substantial movement of material into and from the molten bath.

Preferably the solid material includes ferrous material and/or solid carbonaceous material.

The above-described expanded molten bath zone is quite different to the layer of foaming slag produced in the above-described AISI process.

Preferably step (b) includes injecting feed materials into the molten bath so that the feed materials penetrate a lower region of the molten bath.

Preferably the expanded molten bath zone forms on the lower region of the molten bath.

Preferably step (b) includes injecting feed materials into the molten bath via the lance at a velocity in the range of 80–100 m/s.

Preferably step (b) includes injecting feed materials into the molten bath via the lance at a mass flow rate of up to 2.0 t/m$^2$/s where m$^2$ relates to the cross-sectional area of the lance delivery tube.

Preferably step (b) includes injecting feed materials into the molten bath via the lance at a solids/gas ratio of 10–25 kg solids/Nm$^3$ gas.

More preferably the solid gas ratio is 10–18 kg solids/Nm$^3$ gas.

Preferably the gas flow within the molten bath generated in step (b) is at least 0.04 Nm$^3$/s/m$^2$ at the quiescent surface of the molten bath.

More preferably the gas flow within the molten bath is at a flow rate of at least 0.2 Nm$^3$/s/m$^2$.

More preferably the gas flow rate is at least 0.3 Nm$^3$/s/m$^2$.

Preferably the gas flow rate is less than 2 Nm$^3$/s/m$^2$.

The gas flow within the molten bath may be generated in part as a result of bottom and/or side wall injection of a gas into the molten bath, preferably the lower region of the molten bath.

Preferably the oxygen-containing gas is air or oxygen-enriched air.

Preferably the process includes injecting air or oxygen-enriched air into the vessel at a temperature of 800–1400° C. and at a velocity of 200–600 m/s via at least one oxygen gas injection lance and forcing the expanded molten bath zone in the region of the lower end of the lance away from the lance and forming a "free" space around the lower end of the lance that has a concentration of molten material that is lower than the molten material concentration in the expanded molten bath zone; the lance being located so that: (i) a central axis of the lance is at an angle of 20 to 90° relative to a horizontal axis; (ii) the lance extends into the vessel a distance that is at least the outer diameter of the lower end of the lance; and (iii) the lower end of the lance is at least 3 times the outer diameter of the lower end of the lance above the quiescent surface of the molten bath.

Preferably the concentration of molten material in the free space around the lower end of the lance is 5% or less by volume of the space.

Preferably the free space around the lower end of the lance is a semi-spherical volume that has a diameter that is at least 2 times the outer diameter of the lower end of the lance.

Preferably the free space around the lower end of the lance is no more than 4 times the outer diameter of the lower end of the lance.

Preferably at least 50%, more preferably at least 60%, by volume of the oxygen in the air or oxygen enriched air is combusted in the free space around the lower end of the lance.

Preferably the process includes injecting air or oxygen-enriched air into the vessel in a swirling motion.

The term "smelting" is understood herein to mean thermal processing wherein chemical reactions that reduce the ferrous feed material take place to produce liquid metal.

The term "quiescent surface" in the context of the molten bath is understood to mean the surface of the molten bath under process conditions in which there is no gas/solids injection and therefore no bath agitation.

Preferably the process includes maintaining a high slag inventory in the vessel relative to the molten ferrous metal in the vessel.

The amount of slag in the vessel, ie the slag inventory, has a direct impact on the amount of slag that is in the expanded molten bath zone.

The relatively low heat transfer characteristics of slag compared to metal is important in the context of minimising heat loss from the expanded molten bath zone to the water cooled side walls and from the vessel via the side walls of the vessel.

By appropriate process control, slag in the expanded molten bath zone can form a layer or layers on the side walls that adds resistance to heat loss from the side walls.

Therefore, by changing the slag inventory it is possible to increase or decrease the amount of slag in the expanded molten bath zone and on the side walls and therefore control the heat loss via the side walls of the vessel.

The slag may form a "wet" layer or a "dry" layer on the side walls. A "wet" layer comprises a frozen layer that adheres to the side walls, a semi-solid (mush) layer, and an outer liquid film. A "dry" layer is one in which substantially all of the slag is frozen.

The amount of slag in the vessel also provides a measure of control over the extent of post combustion.

Specifically, if the slag inventory is too low there will be increased exposure of metal in the expanded molten bath zone and therefore increased oxidation of metal and dissolved carbon in metal and the potential for reduced post-combustion and consequential decreased post combustion, notwithstanding the positive effect that metal in the expanded molten bath zone has on heat transfer to the metal layer.

In addition, if the slag inventory is too high the one or more than one oxygen-containing gas injection lance/tuyere will be buried in the expanded molten bath zone and this minimises movement of top space reaction gases to the end of the or each lance/tuyere and, as a consequence, reduces potential for post-combustion.

The amount of slag in the vessel, ie the slag inventory, may be controlled by the tapping rates of metal and slag.

The production of slag in the vessel may be controlled by varying the feed rates of metalliferous feed material, carbonaceous material, and fluxes to the vessel and operating parameters such as oxygen-containing gas injection rates.

Preferably the process includes controlling the level of dissolved carbon in molten iron to be at least 3 wt % and maintaining the slag in a strongly reducing condition leading to FeO levels of less than 6 wt %, more preferably less than 5 wt %, in the slag.

Preferably ferrous material is smelted to metal at least predominantly in the lower region of the molten bath. Invariably, this region of the vessel is where there will be a high concentration of metal.

In practice, there will be a proportion of the ferrous material that is smelted to metal in other regions of the vessel. However, the objective of the process of the present invention, and an important difference between the process and prior art processes, is to maximise smelting of ferrous material in the lower region of the molten bath.

Step (b) of the process may include injecting feed materials through a plurality of solids injection lances and generating the gas flow of at least $0/04$ $Nm^3/s/m^2$ within the molten bath.

The injection of ferrous material and carbonaceous material may be through the same or separate lances.

Preferably the process includes causing molten material to be projected above the expanded molten bath zone.

Preferably the level of post-combustion is at least 40%, where post-combustion is defined as:

$$\frac{[CO_2] + [H_2O]}{[CO_2] + [H_2O] + [CO] + [H_2]}$$

where:

[$CO_2$]=volume % of $CO_2$ in off-gas
[$H_2O$]=volume % of $H_2O$ in off-gas
[$CO$]=volume % of CO in off-gas
[$H_2$]=volume % of $H_2$ in off-gas The expanded molten bath zone is important for 2 reasons.

Firstly, the ascending and thereafter descending molten material is an effective means of transferring to the molten bath the heat generated by post-combustion of reaction gases.

Secondly, the molten material, and particularly the slag, in the expanded molten bath zone is an effective means of minimising heat loss via the side walls of the vessel.

An important difference between the preferred embodiment of the process of the present invention and prior art processes is that in the preferred embodiment the main smelting region is the lower region of the molten bath and the main oxidation (ie heat generation) region is above and in an upper region of the expanded molten bath zone and these regions are spatially well separated and heat transfer is via physical movement of molten metal and slag between the two regions.

According to the present invention there is also provided an apparatus for producing metal from a ferrous material by a direct smelting process, which apparatus includes a fixed non-tiltable vessel that contains a molten bath of metal and slag and includes a lower region and an expanded molten bath zone above the lower region, the expanded molten bath zone being formed by gas flow from the lower region which carries molten material upwardly from the lower region, which vessel includes:

(a) a hearth formed of refractory material having a base and sides in contact with the lower region of the molten bath;

(b) side walls extending upwardly from the sides of the hearth and being in contact with an upper region of the molten bath and the gas continuous space, wherein the side walls that contact the gas continuous space include water cooled panels and a layer of slag on the panels;

(c) at least one lance extending downwardly into the vessel and injecting oxygen-containing gas into the vessel above the molten bath;

(d) at least one lance injecting feed materials being ferrous material and/or carbonaceous material and carrier gas into the molten bath at a velocity of at least 40 m/s, the lance being located so that a central axis of an outlet end of the lance is angled downwardly at an angle of 20 to 90° to a horizontal axis, the lance having a delivery tube for injecting feed materials which has an internal diameter of 40–200 mm; and (e) a means for tapping molten metal and slag from the vessel.

Preferably the feed material injection lance is located so that the outlet end of the lance is 150–1500 mm above the nominal quiescent surface of a metal layer of the molten bath.

Preferably the feed materials injection lance includes a central core tube through which to pass the solid particulate material; an annular cooling jacket surrounding the central core tube throughout a substantial part of its length, which jacket defines an inner elongate annular water flow passage disposed about the core tube, an outer elongate annular water flow passage disposed about the inner water flow passage, and an annular end passage interconnecting the inner and outer water flow passages at a forward end of the cooling jacket; water inlet means for inlet of water into the inner annular water flow passage of the jacket at a rear end region of the jacket; an water outlet means for outlet of water from the outer annular water flow passage at the rear end region of the jacket, whereby to provide for flow of cooling water forwardly along the inner elongate annular passage to the forward end of the jacket then through the end flow passage means and backwardly through the outer elongate annular water flow passage, wherein the annular end passage curves smoothly outwardly and backwardly from the inner elongate annular passage to the outer elongate annular passage and the effective cross-sectional area for water flow through the end passage is less than the cross-sectional flow areas of both the inner and outer elongate annular water flow passages.

The present invention is described further by way of example with reference to the accompanying drawings of which.

BRIEF DESCRIPTION OF THE DRAWINGS

DETAILED DESCRIPTION OF THE PREFERRED EMBODIMENTS

The following description is in the context of smelting iron ore to produce molten iron and it is understood that the present invention is not limited to this application and is applicable to any suitable ferrous ores and/or concentrates—including partially reduced metallic ores and waste revert materials.

Figure 1:
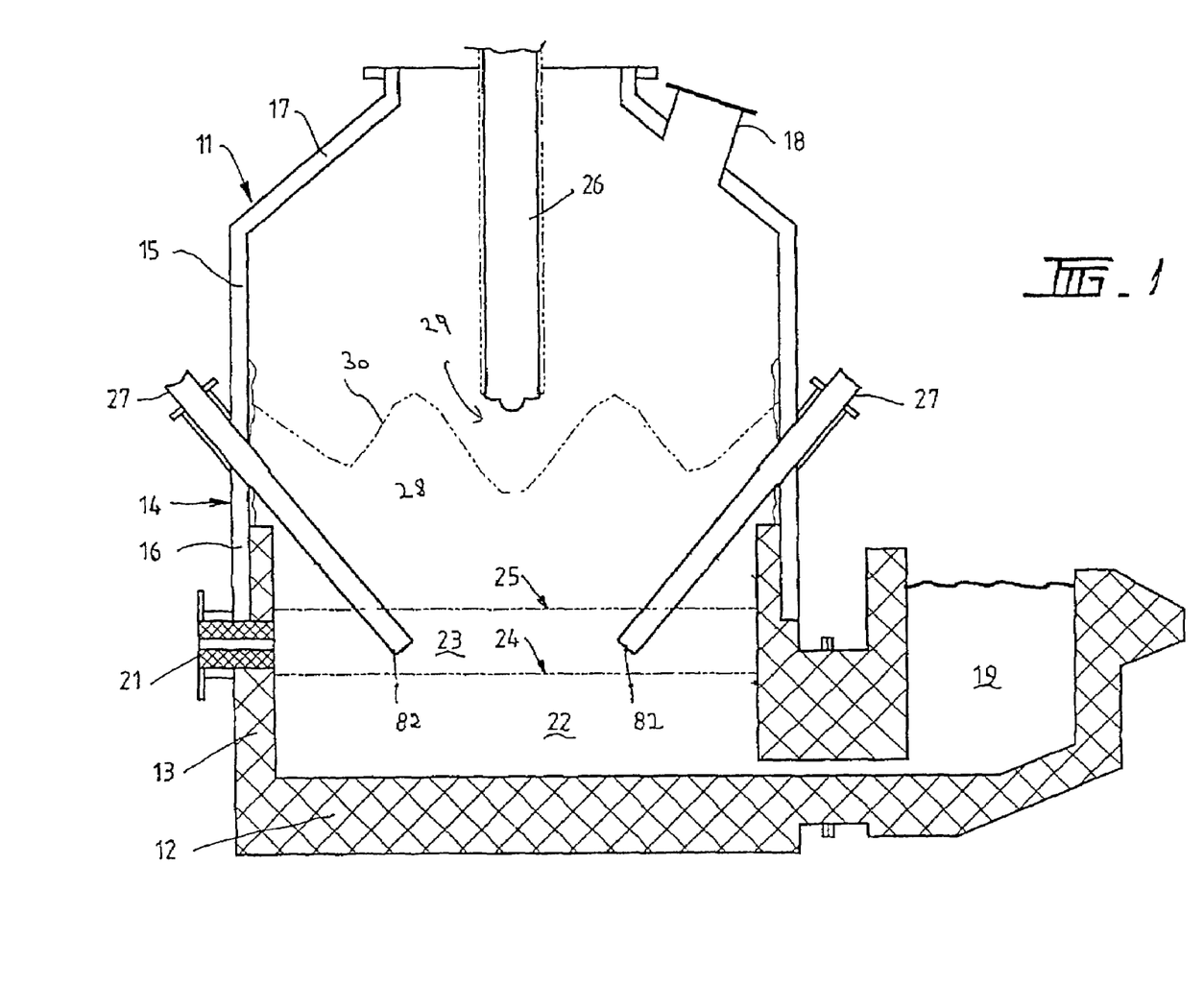
FIG. 1 is a vertical section illustrating in schematic form a preferred embodiment of the process and the apparatus of the present invention.

The direct smelting apparatus shown in FIG. 1 includes a metallurgical vessel denoted generally as 11. The vessel 11 has a hearth that incudes a base 12 and sides 13 formed from refractory bricks; side walls 14 which form a generally cylindrical barrel extending upwardly from the sides 13 of the hearth and which includes an upper barrel section formed from water cooled panels (not shown) and a lower barrel section formed from water cooled panels (not shown) having an inner lining of refractory bricks; a roof 17; an outlet 18 for off-gases; a forehearth 19 for discharging molten metal continuously; and a tap-hole 21 for discharging molten slag.

In use, under quiescent conditions, the vessel contains a molten bath of iron and slag which includes a layer 22 of molten metal and a layer 23 of molten slag on the metal layer 22.

The term "metal layer" is understood herein to mean that region of the bath that is predominantly metal.

The space above the nominal quiescent surface of the molten bath is hereinafter referred to as the "top space".

The arrow marked by the numeral 24 indicates the position of the nominal quiescent surface of the metal layer 22 and the arrow marked by the numeral 25 indicates the position of the nominal quiescent surface of the slag layer 23 (ie of the molten bath).

The term "quiescent surface" is understood to mean the surface when there is no injection of gas and solids into the vessel.

The vessel is fitted with a downwardly extending hot air injection lance 26 for delivering a hot air blast into an upper region of the vessel and post-combusting reaction gases released from the molten bath. The lance 26 has an outer diameter D at a lower end of the lance. The lance 26 is located so that:

(i) a central axis of the lance 26 is at an angle of 20 to 90° relative to a horizontal axis (the lance 26 shown in FIG. 1 is at an angle of 90°);

(ii) the lance 26 extends into the vessel a distance that is at least the outer diameter D of the lower end of the lance; and (iii) the lower end of the lance 26 is at least 3 times the outer diameter D of the lower end of the lance above the quiescent surface 25 of the molten bath.

The vessel is also fitted with solids injection lances 27 (two shown) extending downwardly and inwardly through the side walls 14 and into the molten bath with outlet ends 82 of the lances 27 at an angle of 20–70° to the horizontal for injecting iron ore, solid carbonaceous material, and fluxes entrained in an oxygen-deficient carrier gas into the molten bath. The position of the lances 27 is selected so that their outlet ends 82 are above the quiescent surface 24 of the metal layer 22. This position of the lances 27 reduces the risk of damage through contact with molten metal and also makes it possible to cool the lances 27 by forced internal water cooling without significant risk of water coming into contact with the molten metal in the vessel. Specifically, the position of the lances 27 is selected so that the outlet ends 82 are in the range of 150–1500 mm above the quiescent surface 24 of the metal layer 22. In this connection, it is noted that, whilst the lances 27 are shown in FIG. 1 as extending into the vessel, the outlet ends of the lances 27 may be flush with the side wall 14. The lances 27 are described in more detail with reference to FIGS. 2–5.

In use, iron ore, solid carbonaceous material (typically coal), and fluxes (typically lime and magnesia) entrained in a carrier gas (typically $N_2$) are injected into the molten bath via the lances 27 at a velocity of at least 40 m/s, preferably 80–100 m/s. The momentum of the solid material/carrier gas causes the solid material and gas to penetrate to a lower region of the molten bath. The coal is devolatilised and thereby produces gas in the lower bath region. Carbon partially dissolves into the metal and partially remains as solid carbon. The iron ore is smelted to metal and the smelting reaction generates carbon monoxide gas. The gases transported into the lower bath region and generated via devolatilisation and smelting produce significant buoyancy uplift of molten metal, solid carbon, and slag (drawn into the lower bath region as a consequence of solid/gas/injection) from the lower bath region which generates an upward movement of splashes, droplets and streams of molten metal and slag, and these splashes, and droplets, and streams entrain slag as they move through an upper region of the molten bath. The gas flow generated by the above-described injection of carrier gas and bath reactions is at least 0.04 $Nm^3/s/m^2$ of the quiescent surface of the molten bath (ie the surface 25).

The buoyancy uplift of molten metal, solid carbon and slag causes substantial agitation in the molten bath, with the result that the molten bath expands in volume and forms an expanded molten bath zone 28 that has a surface indicated by the arrow 30. The extent of agitation is such that there is substantial movement of molten material within the molten bath (including movement of molten material into and from the lower bath region) and strong mixing of the molten bath to the extent that there is reasonably uniform temperature throughout the molten bath—typically, 1450–1550° C. with a temperature variation of the order of 30° in each region.

In addition, the upward gas flow projects some molten material (predominantly slag) beyond the expanded molten bath zone 28 and onto the part of the upper barrel section of the side walls 14 that is above the expanded molten bath zone 28 and onto the roof 17.

In general terms, the expanded molten bath zone 28 is a liquid continuous volume, with gas bubbles therein.

In addition to the above, in use, hot air at a temperature of 800–1400° C. is discharged at a velocity of 200–600 m/s via lance 26 and penetrates the central region of the expanded molten bath zone 28 and causes an essentially metal/slag free space 29 to form around the end of the lance 26.

The hot air blast via the lance 26 post-combusts reaction gases CO and $H_2$ in the expanded molten bath zone 28 and in the free space 29 around the end of the lance 26 and generates high temperatures of the order of 2000° C. or higher in the gas space. The heat is transferred to the ascending and descending splashes droplets, and streams, of molten material in the region of gas injection and the heat is then partially transferred throughout the molten bath.

The free space 29 is important to achieving high levels of post combustion because it enables entrainment of gases in the space above the expanded molten bath zone 28 into the end region of the lance 26 and thereby increases exposure of available reaction gases to post combustion.

The combined effect of the position of the lance 26, gas flow rate through the lance 26, and upward movement of splashes, droplets and streams of molten material is to shape the expanded molten bath zone 28 around the lower region of the lance 26. This shaped region provides a partial barrier to heat transfer by radiation to the side walls 14.

Moreover, the ascending and descending droplets, splashes and streams of molten material is an effective means of transferring heat from the expanded molten bath zone 28 to the molten bath with the result that the temperature of the zone 28 in the region of the side walls 14 is of the order of 1450° C.–1550° C.

The construction of the solids injection lances is illustrated in FIGS. 2 to 5.

As shown in these figures, each lance 27 comprises a central core tube 31 through which to deliver the solids material and an annular cooling jacket 32 surrounding the central core tube 31 throughout a substantial part of its length. Central core tube 31 is formed of carbon/alloy steel tubing 33 throughout most of its length, but a stainless steel section 34 at its forward end projects as a nozzle from the forward end of cooling jacket 32. The forward end part 34 of core tube 31 is connected to the carbon/alloy steel section 33 of the core tube through a short steel adaptor section 35 which is welded to the stainless steel section 34 and connected to the carbon/alloy steel section through a screw thread 36.

Figure 2A:
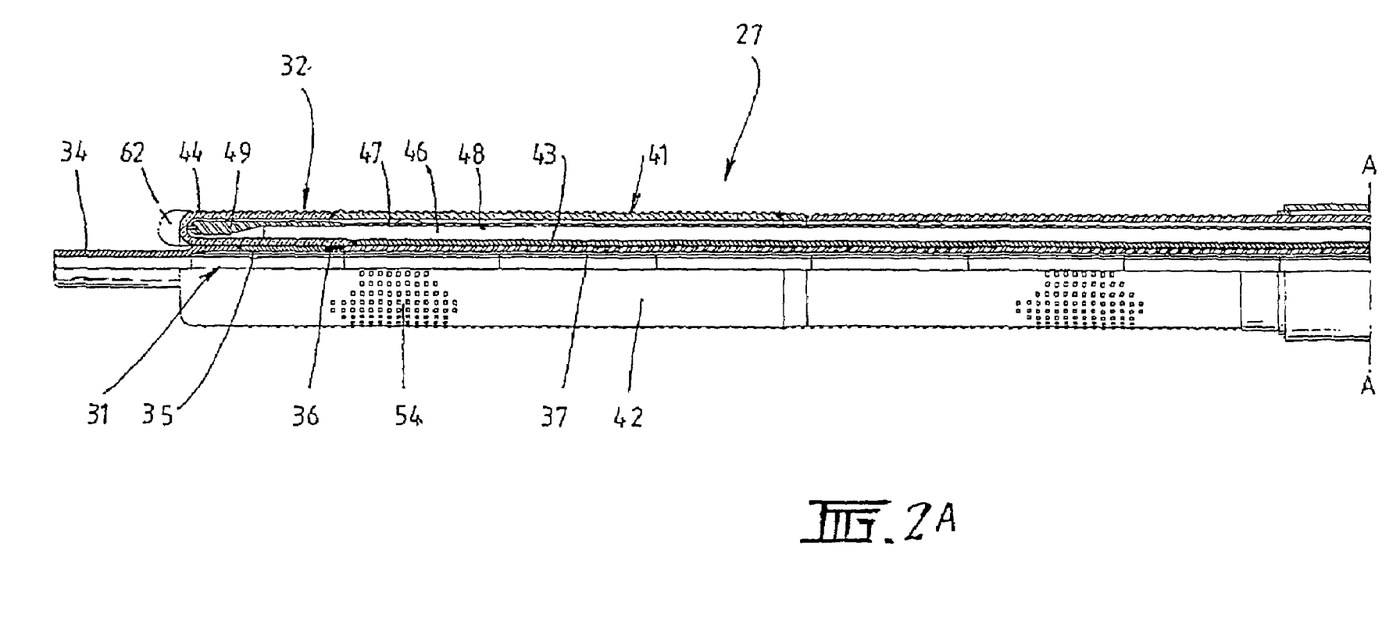
FIGS. 2A and 2B join on the line A—A to form a longitudinal cross-section through one of the solids injection lances shown in FIG. 1.
Figure 2B:
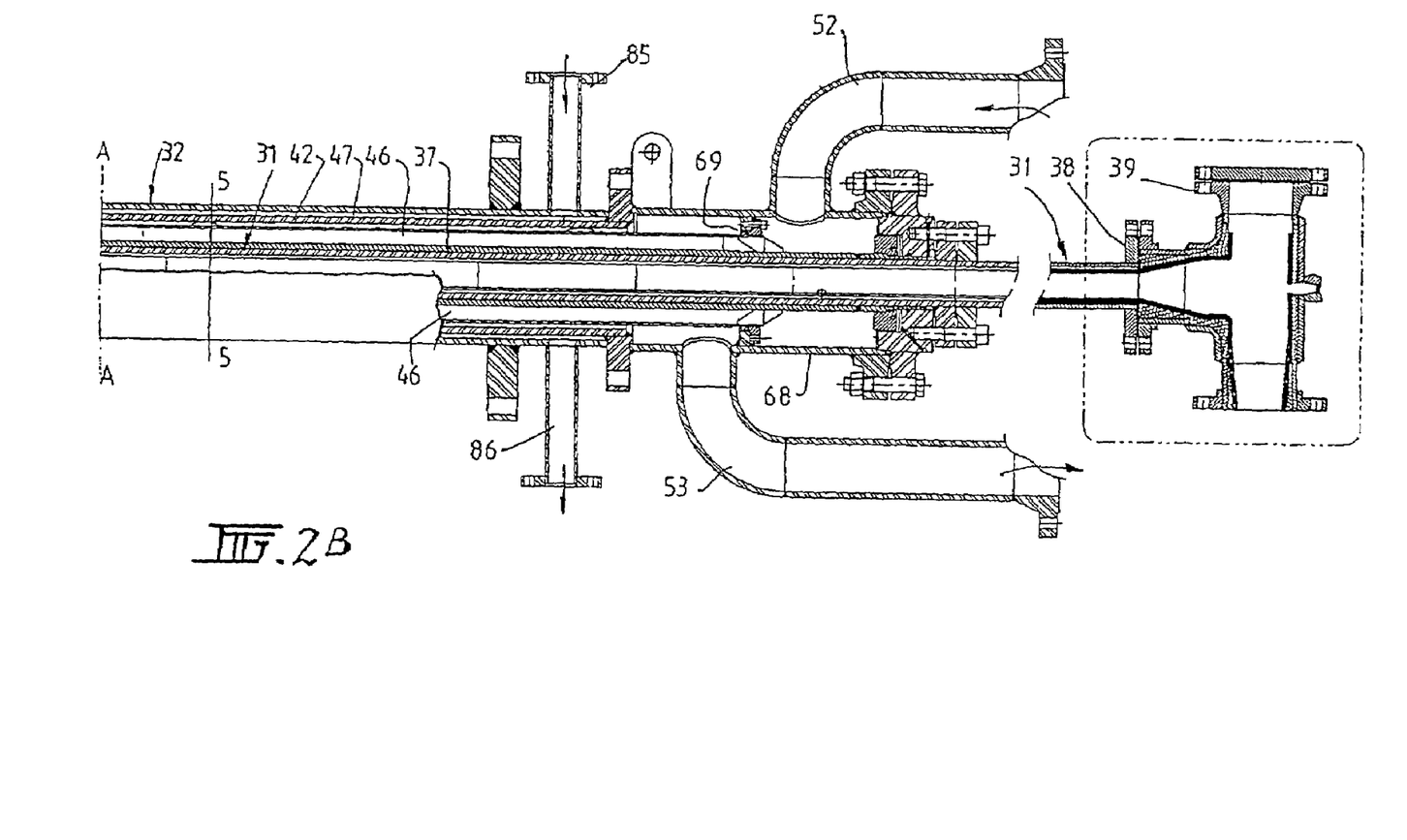
Figure 3:
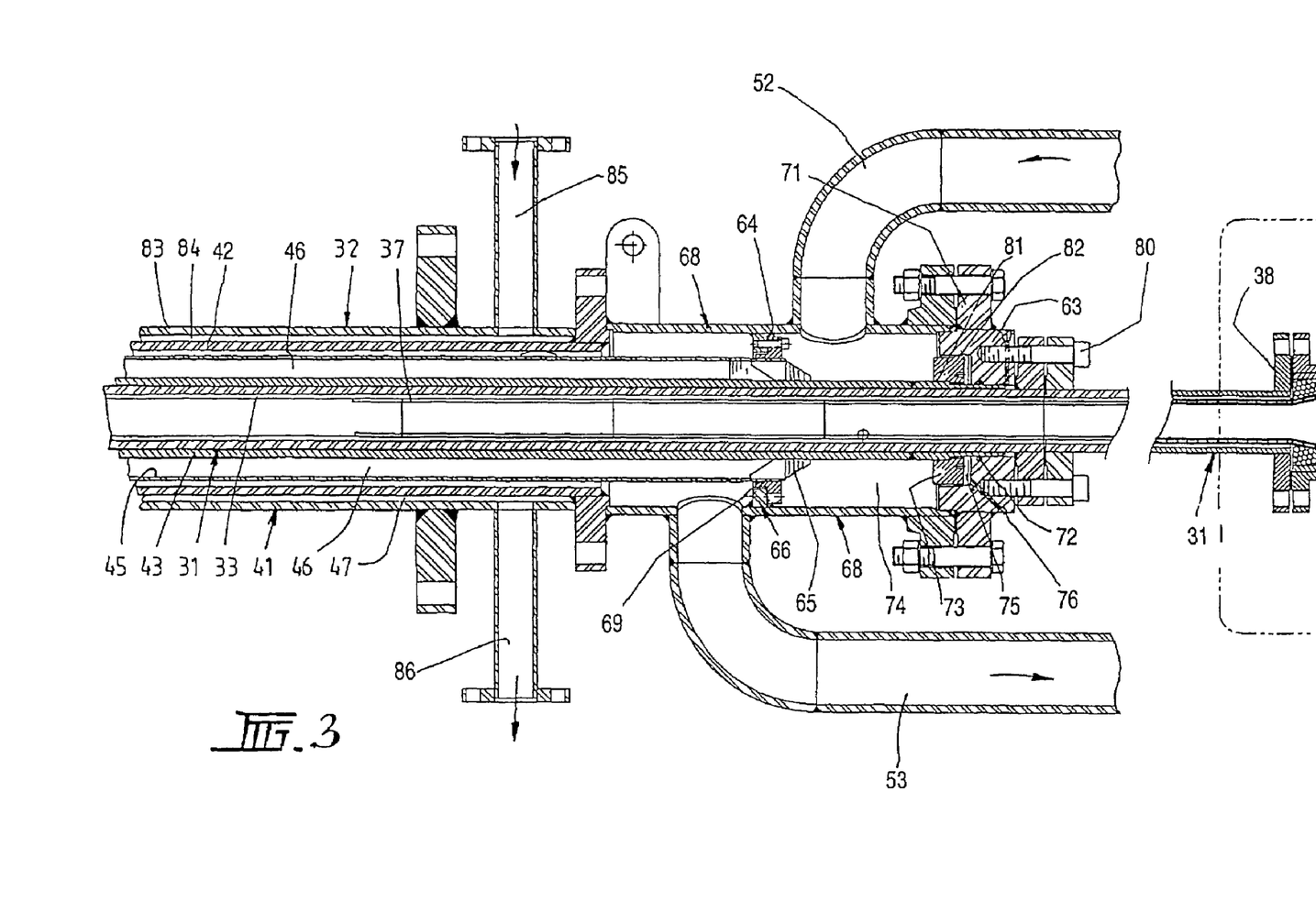
FIG. 3 is an enlarged longitudinal cross-section through a rear end of the lance.

Central core tube 31 is internally lined through to the forward end part 34 with a thin ceramic lining 37 formed by a series of cast ceramic tubes. The rear end of the central core tube 31 is connected through a coupling 38 to a T-piece 39 through which particulate solids material is delivered in a pressurised fluidising gas carrier, for example nitrogen.

Figure 4:
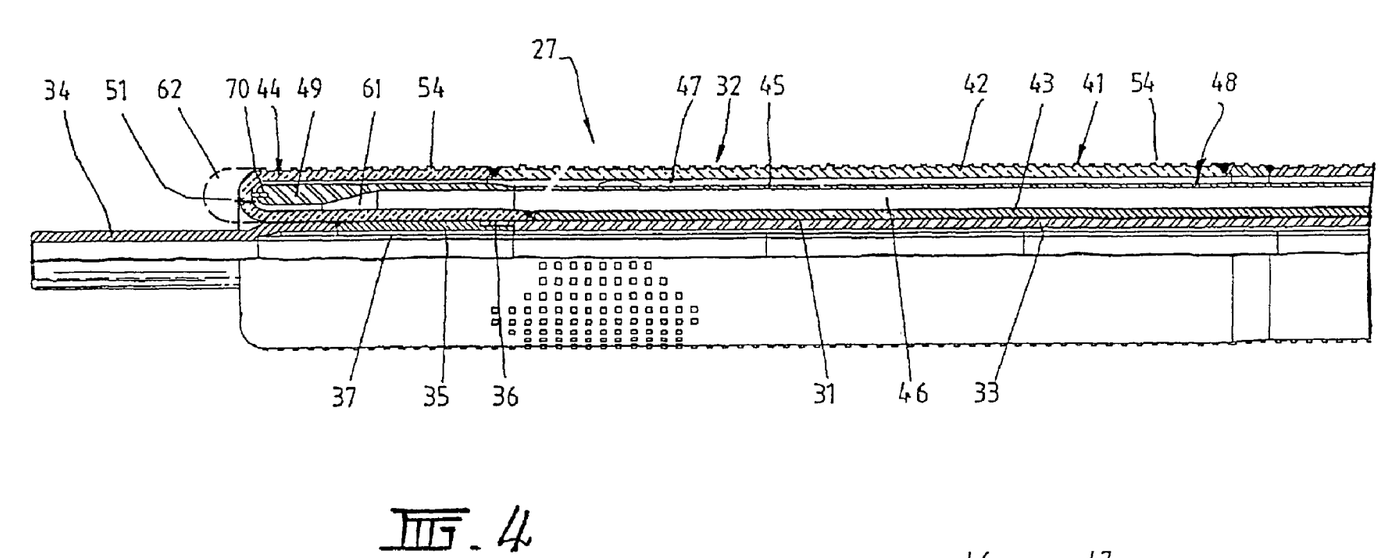
FIG. 4 is an enlarged cross-section through the forward end of the lance.
Figure 5:
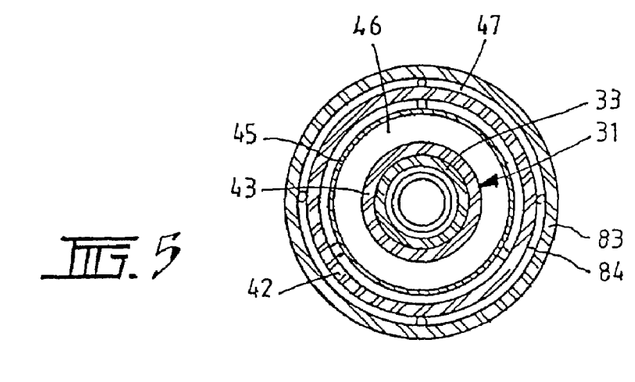
FIG. 5 is a transverse cross-section on the line 5—5 in FIG. 4.

Annular cooling jacket 32 comprises a long hollow annular structure 41 comprised of outer and inner tubes 42, 43 interconnected by a front end connector piece 44 and an elongate tubular structure 45 which is disposed within the hollow annular structure 41 so as to divide the interior of structure 41 into an inner elongate annular water flow passage 46 and an outer elongate annular water flow passage 47. Elongate tubular structure 45 is formed by a long carbon steel tube 48 welded to a machined carbon steel forward end piece 49 which fits within the front end connector 44 of the hollow tubular structure 41 to form an annular end flow passage 51 which interconnects the forward ends of the inner and outer water flow passages 46, 47.

The rear end of annular cooling jacket 32 is provided with a water inlet 52 through which the flow of cooling water can be directed into the inner annular water flow passage 46 and a water outlet 53 from which water is extracted from the outer annular passage 47 at the rear end of the lance. Accordingly, in use of the lance cooling water flows forwardly down the lance through the inner annular water flow passage 46 then outwardly and back around the forward annular end passage 51 into the outer annular passage 47 through which it flows backwardly along the lance and out through the outlet 53. This ensures that the coolest water is in heat transfer relationship with the incoming solids material to ensure that this material does not melt or burn before it discharges from the forward end of the lance and enables effective cooling of both the solids material being injected through the central core of the lance as well as effective cooling of the forward end and outer surfaces of the lance.

The outer surfaces of the tube 42 and front end piece 44 of the hollow annular structure 41 are machined with a regular pattern of rectangular projecting bosses 54 each having an undercut or dove tail cross-section so that the bosses are of outwardly diverging formation and serve as keying formations for solidification of slag on the outer surfaces of the lance. Solidification of slag on to the lance assists in minimising the temperatures in the metal components of the lance. It has been found in use that slag freezing on the forward or tip end of the lance serves as a base for formation of an extended pipe of solid material serving as an extension of the lance which further protects exposure of the metal components of the lance to the severe operating conditions within the vessel.

It has been found that it is very important to cooling of the tip end of the lance to maintain a high water flow velocity around the annular end flow passage 51. In particular it is most desirable to maintain a water flow velocity in this region of the order of 10 meters per second to obtain maximum heat transfer. In order to maximise the water flow rate in this region, the effective cross-section for water flow through passage 51 is significantly reduced below the effective cross-section of both the inner annular water flow passage 46 and the outer water flow passage 47. Forward end piece 49 of the inner tubular structure 45 is shaped and positioned so that water flowing from the forward end of inner annular passage 46 passes through an inwardly reducing or tapered nozzle flow passage section 61 to minimise eddies and losses before passing into the end flow passage 51. The end flow passage 51 also reduces in effective flow area in the direction of water flow so as to maintain the increased water flow velocity around the bend in the passage and back to the outer annular water flow passage 47. In this manner, it is possible to achieve the necessary high water flow rates in the tip region of the cooling jacket without excessive pressure drops and the risk of blockages in other parts of the lance.

In order to maintain the appropriate cooling water velocity around the tip end passage 51 and to minimise heat transfer fluctuations, it is critically important to maintain a constant controlled spacing between the front end piece 49 tubular structure 45 and the end piece 44 of the hollow annular structure 41. This presents a problem due to differential thermal expansion and contraction in the components of the lance. In particular, the outer tube part 42 of hollow annular structure 41 is exposed to much higher temperatures than the inner tube part 43 of that structure and the forward end of that structure therefore tends to roll forwardly in the manner indicated by the dotted line 62 in FIG. 4. This produces a tendency for the gap between components 44, 49 defining the passage 51 to open when the lance is exposed to the operating conditions within the smelting vessel. Conversely, the passage can tend to close if there is a drop in temperature during operation. In order to overcome this problem the rear end of the inner tube 43 of hollow annular structure 41 is supported in a sliding mounting 63 so that it can move axially relative to the outer tube 42 of that structure, the rear end of inner tubular structure 45 is also mounted in a sliding mounting 64 and is connected to the inner tube 43 of structure 41 by a series of circumferentially spaced connector cleats 65 so that the tubes 43 and 45 can move axially together. In addition, the end pieces 44, 49 of the hollow annular structure 41 and tubular structure 45 are positively interconnected by a series of circumferentially spaced dowels 70 to maintain the appropriate spacing under both thermal expansion and contraction movements of the lance jacket.

The sliding mounting 64 for the inner end of tubular structure 45 is provided by a ring 66 attached to a water flow manifold structure 68 which defines the water inlet 52 and outlet 53 and is sealed by an O-ring seal 69. The sliding mounting 63 for the rear end of the inner tube 43 of structure 41 is similarly provided by a ring flange 71 fastened to the water manifold structure 68 and is sealed by an O-ring seal 72. An annular piston 73 is located within ring flange 71 and connected by a screw thread connection 80 to the back end of the inner tube 43 of structure 41 so as to close a water inlet manifold chamber 74 which receives the incoming flow of cooling from inlet 52. Piston 73 slides within hardened surfaces on ring flange 71 and is fitted with O-rings 81, 82. The sliding seal provided by piston 73 not only allows movements of the inner tube 43 due to differential thermal expansion of structure 41 but it also allows movement of tube 43 to accommodate any movement of structure 41 generated by excessive water pressure in the cooling jacket. If for any reason the pressure of the cooling water flow becomes excessive, the outer tube of structure 41 will be forced outwardly and piston 73 allows the inner tube to move accordingly to relieve the pressure build up. An interior space 75 between the piston 73 and the ring flange 71 is vented through a vent hole 76 to allow movement of the piston and escape of water leaking past the piston.

The rear part of annular cooling jacket 32 is provided with an outer stiffening pipe 83 part way down the lance and defining an annular cooling water passage 84, through which a separate flow of cooling water is passed via a water inlet 85 and water outlet 86.

Typically cooling water will be passed through the cooling jacket at a flow rate of 100 m$^3$/hr at a maximum operating pressure of 800 kPa to produce water flow velocities of 10 meters/minute in the tip region of the jacket. The inner and outer parts of the cooling jacket can be subjected to temperature differentials of the order of 200° C. and the movement of tubes 42 and 45 within the sliding mountings 63, 64 can be considerable during operation of the lance, but the effective cross-sectional flow area of the end passage 51 is maintained substantially constant throughout all operating conditions.

It is to be understood that this invention is in no way limited to the details of the illustrated construction and that many modifications and variations will fall within the spirit and scope of the invention.

In that regard it is noted that the oxygen gas injection lance can be integral with and form part of the upper body of a solids injections lance.

What is claimed is:

1. A direct smelting process for producing metals which term includes metal alloys from a ferrous material which includes the steps of:
    (a) forming a bath of molten metal and molten slag in a metallurgical vessel;
    (b) injecting feed materials being solid material and carrier gas into the molten bath at a velocity of at least 40 m/s through a downwardly extending solids injection lance having a delivery tube of internal diameter of 40–200 mm that is located so that a central axis of an outlet end of the lance is at an angle of 20 to 90 degrees to a horizontal axis and generating a superficial gas flow of at least 0.04 Nm$^3$/s/m$^2$ within the molten bath (where m$^2$ relates to the area of a horizontal crosssection through the molten bath) at least in part by reactions of injected material in the bath which causes molten material to be projected upwardly as splashes, droplets and streams and form an expanded molten bath zone, the gas flow and the upwardly projected molten material causing substantial movement of material within the molten bath and strong mixing of the molten bath, the feed materials being selected so that, in an overall sense, the reactions of the feed materials in the molten bath are endothermic; and
    (c) injecting an oxygen-containing gas into an upper region of the vessel via at least one oxygen gas injection lance and post-combusting combustible gases released from the molten bath, whereby ascending and thereafter descending molten material in the expanded molten bath zone facilitate heat transfer to the molten bath.

2. The process defined in claim 1 wherein step (b) injecting feed materials into the molten bath so that the feed materials penetrate a lower region of the molten bath.

3. The process defined in claim 1 wherein step (b) includes injecting feed materials into the molten bath via the lance at a velocity in the range of 80–100 m/s.

4. The process defined in claim 3 wherein step (b) includes injecting feed materials into the molten bath via the lance at a mass flow rate of up to 2.0 t/m$^2$/s where m$^2$ relates to the cross-sectional area of the lance delivery tube.

5. The process defined in claim 1 wherein step (b) includes injecting feed materials into the molten bath via the lance at a solids/gas ratio of 10–25 kg solids/Nm$^3$ gas.

6. The process defined in claim 5 wherein the solids/gas ratio is 10–18 kg solids/Nm$^3$ gas.

7. The process defined in claim 1 wherein step (b) includes injecting feed materials through a plurality of solids injection lances and generating the gas flow of at least 0.04 Nm$^3$/s/m$^2$ within the molten bath.

8. The process defined in claim 1 wherein the gas flow within the molten bath generated in step (b) is at least 0.04 Nm$^3$/s/m$^2$ at the nominal quiescent surface of the molten bath.

9. The process defined in claim 8 wherein the gas flow within the molten bath is at a flow rate of at least 0.2 Nm$^3$/s/m$^2$.

10. The process defined in claim 9 wherein the gas flow rate is at least 0.3 Nm$^3$/s/m$^2$.

11. The process defined in claim 1 wherein the gas flow within the molten bath generated in step (b) is less than 2 Nm$^3$/s/m$^2$.

12. The process defined in claim 1 wherein the oxygen-containing gas injected into the molten bath in step (c) is air or oxygen-enriched air.

13. The process defined in claim 12 wherein step (c) includes injecting the air or oxygen-enriched air into the vessel at a temperature of 800–1400° C. and at a velocity of 200–600 m/s via at least one oxygen gas injection lance and forcing the expanded molten bath zone in the region of the lower end of the lance away from the lance and forming a "free" space around the lower end of the lance that has a concentration of molten material that is lower than the molten material concentration in the expanded molten bath zone; the lance being located so that: (i) a central axis of the lance is at an angle of 20 to 90° relative to a horizontal axis; (ii) the lance extends into the vessel a distance that is at least the outer diameter of the lower end of the lance; and (iii) the lower end of the lance is at least 3 times the outer diameter of the lower end of the lance above the quiescent surface of the molten bath.

14. The process defined in claim 1 wherein step (c) includes injecting oxygen-containing gas into the vessel in a swirling motion.

15. The process defined in claim 1 including controlling the level of dissolved carbon in molten iron to be at least 3 wt % and maintaining the slag in a strongly reducing condition leading to FeO levels of less than 6 wt %, more preferably less than 5 wt %, in the slag.

16. The process defined in claim 1 including causing molten material to be projected into a top space above the expanded molten bath zone.

17. The process defined in claim 1 wherein step (c) includes post-combusting combustible gasses so that the level of post-combustion is at least 40%, where post-combustion is defined as:

$$\frac{[CO_2] + [H_2O]}{[CO_2] + [H_2O] + [CO] + [H_2]}$$

where:
   $[CO_2]$=volume % of $CO_2$ in off-gas
   $[H_2O]$=volume % of $H_2O$ in off-gas
   $[CO]$=volume % of CO in off-gas
   $[H_2]$=volume % of $H_2$ in off-gas.

* * * * *

UNITED STATES PATENT AND TRADEMARK OFFICE
CERTIFICATE OF CORRECTION

PATENT NO. : 6,989,042 B2
DATED : January 24, 2006
INVENTOR(S) : Rodney J. Dry and Peter D. Burke It is certified that error appears in the above-identified patent and that said Letters Patent is hereby corrected as shown below:

<u>Title page,</u>
Item [57], ABSTRACT,
Line 12, delete "now" and replace with -- flow --.

Signed and Sealed this

Twenty-third Day of May, 2006

JON W. DUDAS
*Director of the United States Patent and Trademark Office*